United States Patent
Ryu et al.

(10) Patent No.: US 9,349,043 B2
(45) Date of Patent: May 24, 2016

(54) APPARATUS AND METHOD FOR DETECTING PEDESTRIANS

(71) Applicant: HYUNDAI MOBIS Co., Ltd., Yongin-si (KR)

(72) Inventors: Dong Kyu Ryu, Seoul (KR); Byung Jun Kang, Yongin-si (KR); Joon Bum Cho, Seoul (KR)

(73) Assignee: HYUNDAI MOBIS CO., LTD., Yongin-si (KR)

( * ) Notice: Subject to any disclaimer, the term of this patent is extended or adjusted under 35 U.S.C. 154(b) by 92 days.

(21) Appl. No.: 14/259,626

(22) Filed: Apr. 23, 2014

(65) Prior Publication Data

US 2015/0146919 A1    May 28, 2015

(30) Foreign Application Priority Data

Nov. 28, 2013    (KR) .................. 10-2013-0146162

(51) Int. Cl.
*G06K 9/00* (2006.01)
*G06K 9/46* (2006.01)

(52) U.S. Cl.
CPC ........ *G06K 9/00369* (2013.01); *G06K 9/00798* (2013.01); *G06K 9/4642* (2013.01)

(58) Field of Classification Search
CPC .................................. G06K 9/00; G06T 7/00
USPC ......................................................... 382/103
See application file for complete search history.

(56) References Cited

U.S. PATENT DOCUMENTS

| | | | | | |
|---|---|---|---|---|---|
| 5,999,877 | A * | 12/1999 | Takahashi | .......... | G06K 9/00785 340/905 |
| 6,445,809 | B1 * | 9/2002 | Sasaki | ...................... | B60R 1/00 340/436 |
| 8,935,292 | B2 * | 1/2015 | Arrasvuori | ........ | G06F 17/30032 707/796 |
| 2007/0255480 | A1 * | 11/2007 | Southall | .................... | B60T 7/22 701/96 |
| 2009/0245582 | A1 * | 10/2009 | Sakamoto | .......... | G06K 9/00798 382/104 |
| 2009/0296987 | A1 * | 12/2009 | Kageyama | ......... | G06K 9/00798 382/103 |
| 2010/0002911 | A1 * | 1/2010 | Wu | ..................... | G06K 9/00798 382/104 |
| 2011/0052050 | A1 * | 3/2011 | Cao | ....................... | G06K 9/4642 382/165 |
| 2013/0342692 | A1 * | 12/2013 | Li | ........................ | G01N 21/538 348/143 |
| 2014/0218509 | A1 * | 8/2014 | Kondo | ............... | G01C 21/3647 348/118 |
| 2014/0270366 | A1 * | 9/2014 | Wang | ................... | G06K 9/6232 382/103 |
| 2014/0270367 | A1 * | 9/2014 | Wang | ....................... | G06K 9/66 382/103 |
| 2015/0055831 | A1 * | 2/2015 | Kawasaki | .......... | G06K 9/00798 382/104 |
| 2015/0086077 | A1 * | 3/2015 | Du | ..................... | G06K 9/00369 382/104 |
| 2015/0160019 | A1 * | 6/2015 | Biswal | .................. | B60W 50/00 701/1 |
| 2015/0235101 | A1 * | 8/2015 | Belman | ................ | G06K 9/4647 348/222.1 |

FOREIGN PATENT DOCUMENTS

| | | |
|---|---|---|
| JP | 2007-328630 A | 12/2007 |
| KR | 10-2012-0065558 A | 6/2012 |
| KR | 10-2013-0021990 A | 3/2013 |

* cited by examiner

*Primary Examiner* — Gregory F Cunningham
(74) *Attorney, Agent, or Firm* — NSIP Law

(57) ABSTRACT

Provided is an image processing apparatus for detecting pedestrians. The image processing apparatus includes a lane detecting module configured to extract a lane coordinate value from an input image and a pedestrian detecting module configured to set, as a pedestrian region of interest (ROI), a region between a first line passing through ends of first left and right lanes and a second line passing through ends of second left and right lanes which are respectively disposed above the left and right lanes, and search for the pedestrian ROI by using a predetermined window to detect a pedestrian region having a pedestrian feature.

13 Claims, 7 Drawing Sheets

APPARATUS AND METHOD FOR DETECTING PEDESTRIANS

CROSS-REFERENCE TO RELATED APPLICATIONS

This application claims priority under 35 U.S.C. §119 to Korean Patent Application No. 10-2013-0146162, filed on Nov. 28, 2013, the disclosure of which is incorporated herein by reference in its entirety.

TECHNICAL FIELD

The present invention relates to a pedestrian detecting apparatus and method, and more particularly, to a pedestrian detecting apparatus and method which are used in vehicles.

BACKGROUND

Recently, as a part of research associated with pedestrian protection, a pedestrian detecting apparatus is equipped in vehicles and released. The pedestrian detecting apparatus detects a pedestrian that suddenly appears in front of a vehicle, and issues a pedestrian warning to a driver or controls driving of the vehicle, thereby preventing a pedestrian accident.

Proposed conventionally was a pedestrian detecting method that acquires an image from a digital image apparatus, block-converts a search window, and detects a pedestrian by using a full search method based on a Support Vector Machine (SVM) classifier. The pedestrian detecting method removes a number of search windows, and detects a pedestrian by using a secondary classifier having a high degree of precision, thereby reducing power consumption based on a high degree of accuracy and a detection operation. However, in the pedestrian detecting method, the amount of data to be processed for pedestrian detection increases as a resolution of an input image becomes higher, and for this reason, a processing speed is slow.

Another method of the related art acquires a final confidence value that is obtained by combining a confidence value based on an edge-based detection analysis and a confidence value based on a motion-based detection analysis, compares the acquired final confidence value and a threshold value to determine whether a pedestrian is included in an input image, and issues a pedestrian warning to a driver according to the determination result. In such a method, since a motion direction of a whole region of an input image is analyzed due to the motion-based detection analysis, a processing speed is slow as in the pedestrian detecting method using the full search method, and moreover, when there is no movement of a pedestrian, an accuracy of pedestrian detection is low.

SUMMARY

Accordingly, the present invention provides a pedestrian detecting apparatus and method for enhancing a processing speed and a performance of pedestrian detection.

In one general aspect, an image processing apparatus for detecting pedestrians includes: a lane detecting module configured to extract a lane coordinate value from an input image; and a pedestrian detecting module configured to set, as a pedestrian Region Of Interest (ROI), a region between a first line passing through ends of first left and right lanes and a second line passing through ends of second left and right lanes which are respectively disposed above the left and right lanes, and search for the pedestrian ROI by using a predetermined window to detect a pedestrian region having a pedestrian feature.

In another general aspect, a pedestrian detecting method in an image processing apparatus includes: extracting a lane coordinate value from an input image; setting a pedestrian ROI and a lane interval in the input image by using the extracted lane coordinate value; setting a search window by using the set lane interval; and detecting a pedestrian region in the set pedestrian ROI by using a pedestrian detection algorithm.

Other features and aspects will be apparent from the following detailed description, the drawings, and the claims.

DETAILED DESCRIPTION OF EMBODIMENTS

Figure 1:
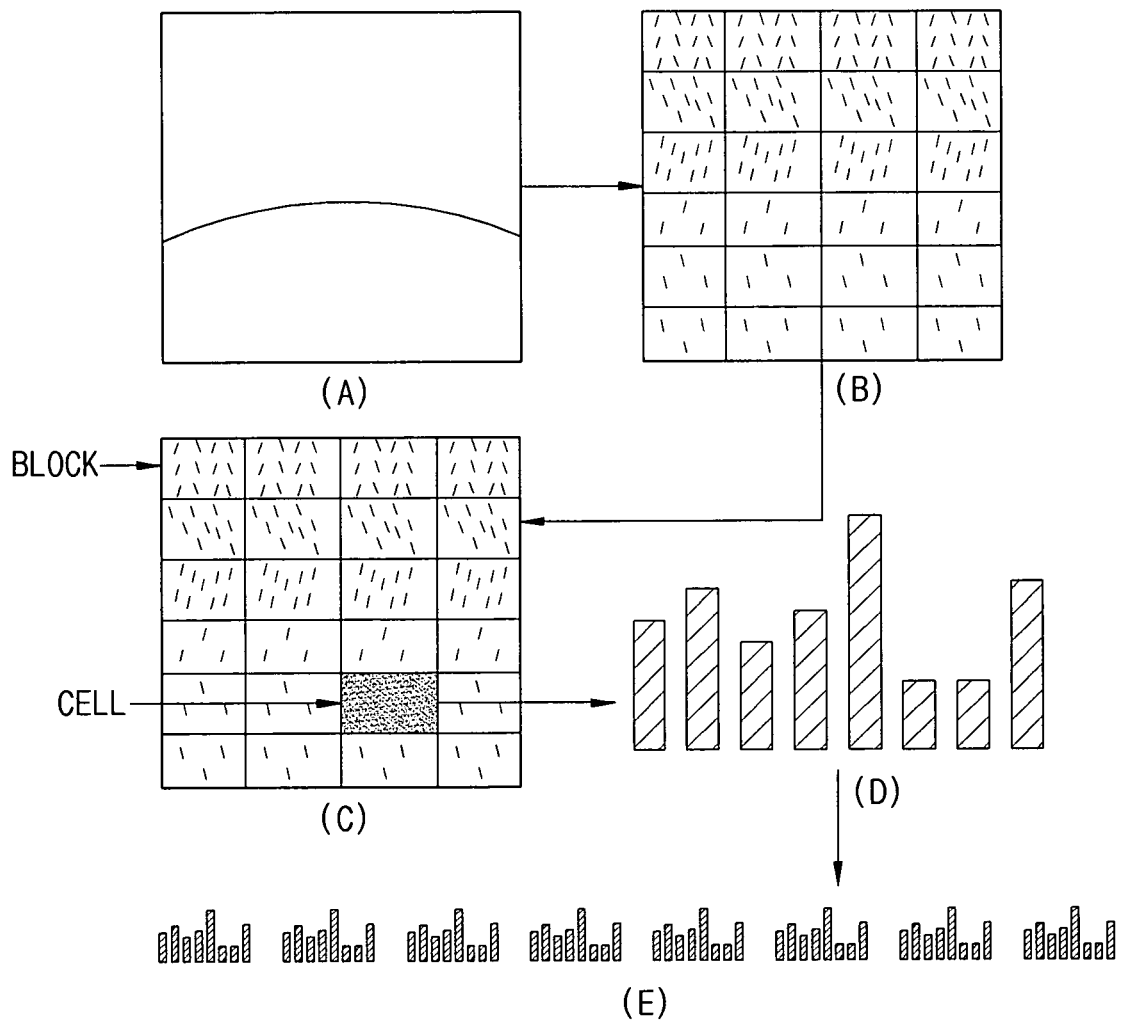
FIG. 1 is diagrams for describing pedestrian detection technology applied to the present invention.

The present invention proposes a pedestrian detecting method that determines whether there is a pedestrian and there is a possibility of collision, by using an image sensor equipped in a vehicle.

Moreover, the present invention proposes a pedestrian detecting method that sets a plurality of candidate pedestrian regions with an actual pedestrian located therein by using lane information, and thus shortens a detection time expended in detecting a pedestrian.

Moreover, the present invention proposes a pedestrian detecting method that divides a candidate pedestrian region into an upper body region and a lower body region, and when pedestrian features are detected from all the upper body region and lower body region, determines the candidate pedestrian region as a pedestrian region, whereby the pedestrian detecting method is robust to noise.

Hereinafter, some technologies applicable to the present invention will be described before embodiments of the present invention are described in detail with reference to the accompanying drawings.

Lane Detection Technology

The lane detection technology may be applied to a Lane Departure Warning System (LDWS) that aids stable driving of a vehicle. The present invention may set a plurality of candidate pedestrian regions by using lane information that is generated by the lane detection technology in association with the LDWS.

The lane detection technology may be provided through various lane detection algorithms. The lane detection algorithms may use a Hough transform, a deformable template model, training-based, and dynamic programming which are well known.

An algorithm using the Hough transform extracts a boundary line of an image, and detects a line by using the Hough transform. The algorithm determines the detected line as a lane through a verification operation.

An algorithm using the deformable template model extracts boundary line information. In such an algorithm, a likelihood function is defined for detecting a lane meeting a defined road model. Algorithms, such as a metropolis algorithm and a simulated annealing algorithm, are used for detecting a lane meeting the likelihood function.

A training-based algorithm uses algorithms such as a Support Vector Machine (SVM) and a neural network, and detects a lane by using a pre-trained classifier. Such a method needs dictionary data and training work for classifier generation.

An algorithm using the dynamic programming first divides a region into a plurality of regions. In such an algorithm, a function for detecting a lane is defined by using limitations in which a lane has continuity between regions, and does not deviate from within a certain angle. A set of regions that best meets the defined function is detected as a lane.

In addition, there is a method that detects a lane by using statistical information of a lane type and colors of lanes. The method moderates sensitivities of yellow, blue, and white that are colors of lanes, and converts RGB colors into YCbCr colors for efficiently emphasizing a lane color. In order to select lane candidates from a lane color-emphasized region, a lane filter shows a high response in a region that has a size similar to that of a width of the lane filter, has large differences with adjacent pixels, and is bright. Such a method can efficiently detect a region corresponding to a lane because of considering a characteristic and width of a lane that is brighter than a road region.

Lanes detected by the above-described methods may be provided as image information in which only a lane is marked in an image, or may be provided as a two-dimensional (2D) coordinate value corresponding to the lane.

Pedestrian Detection Technology

Examples of technologies for detecting a pedestrian included in an image include an HOG feature extracting method. The HOG feature extracting method block-converts an ROI, divides each of the converted blocks into a plurality of cells, calculates slopes between pixels in each of the plurality of cells, and uses a histogram of the slopes.

As illustrated in FIG. 1, a 16×16 image 11 is block-converted into a plurality of blocks 13 in step (A), and each of the plurality of blocks 13 is divided into a plurality cells in step (B). In step (C), slopes between pixels of each of all pixels are calculated sequentially from a left upper-end cell. In step (D), a histogram is analyzed for each cell. In step (E), the analyzed histograms are arranged. As a result, an HOG feature vector of one block is generated. The most dominant slope is analyzed in a plurality of the HOG feature vectors, and when a plurality of the analyzed most dominant slopes form a human shape, a pedestrian is determined as being located in the block.

Hereinafter, embodiments of the present invention will be described in detail with reference to the accompanying drawings.

Figure 2:
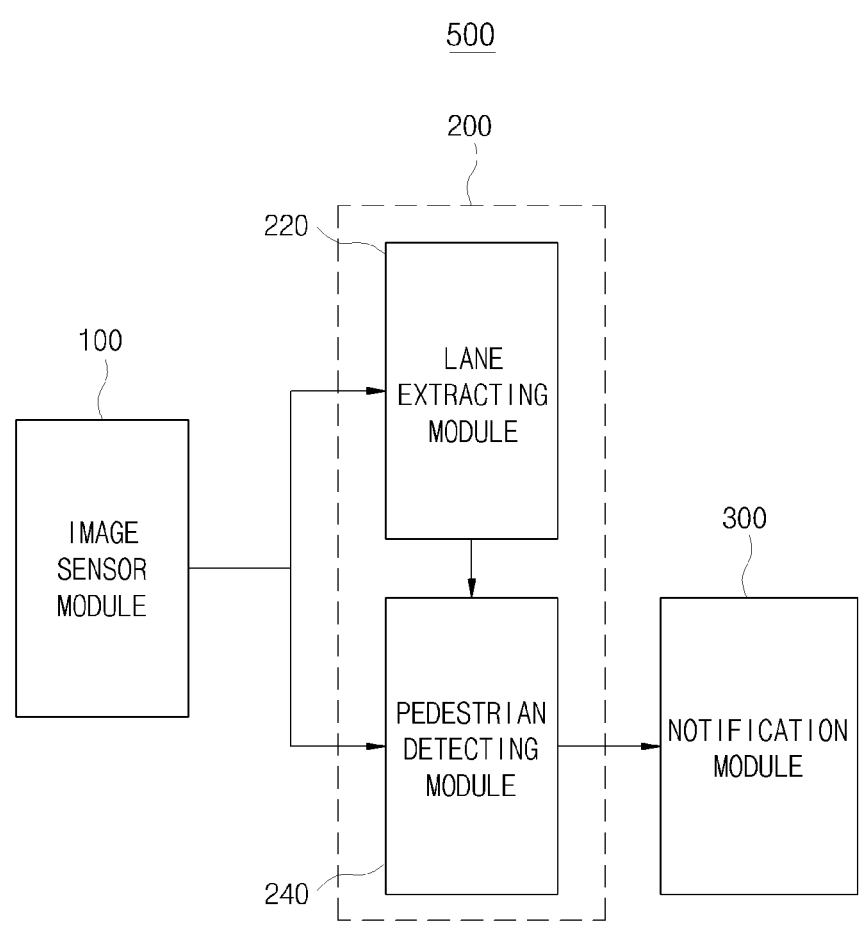
FIG. 2 is a block diagram illustrating an internal configuration of an image processing apparatus according to an embodiment of the present invention.

FIG. 2 is a block diagram illustrating an internal configuration of an image processing apparatus 100 according to an embodiment of the present invention.

Referring to FIG. 2, the image processing apparatus 100 according to an embodiment of the present invention includes an image sensor module 100, an image processing module 200, and a notification module 300.

The image sensor module 100 may be a camera that is equipped in a vehicle, and acquires a front image (hereinafter referred to as an input image).

The image processing module 200 determines whether a pedestrian is included in the input image. When it is determined that the pedestrian is included in the input image, the image processing module 200 notifies a user of the determination result by using the notification module 300. To this end, the image processing module 200 includes a lane extracting module 220 and a pedestrian detecting module 240. The lane extracting module 220 extracts a lane included in the input image according to the above-described lane detection algorithm, and outputs the detected lane as a lane coordinate value. The pedestrian detecting module 240 sets a pedestrian ROI by using a lane coordinate value input from the lane extracting module 220. The pedestrian detecting module 240 calculates a lane interval by using the lane coordinate value, and sets a search window for searching for the pedestrian ROI, which is set by the pedestrian detecting module 240, by using the calculated lane interval. Therefore, a search region for detecting a pedestrian is efficiently limited to the pedestrian ROI, and the pedestrian ROI is searched by using the search window which is adaptively set according to the lane interval, thereby shortening a pedestrian detection time. Also, the pedestrian detecting module 240 divides the pedestrian ROI into an upper body region and a lower body region to more precisely detect a pedestrian region, thereby enhancing a performance of pedestrian detection.

The notification module 300 may convert a collision warning, which is an output result of the pedestrian detecting module 240, into visual or auditory information, and supply the information to a driver. For example, the notification module 300 may be implemented with a display device, a voice output device, or a combination thereof, and may output a warning screen through the display device, or output a warning sound through the voice output device. Alternatively, the notification module 300 may simultaneously output a warning screen and a warning sound through a combination device of the display device and the voice output device.

Figure 3:
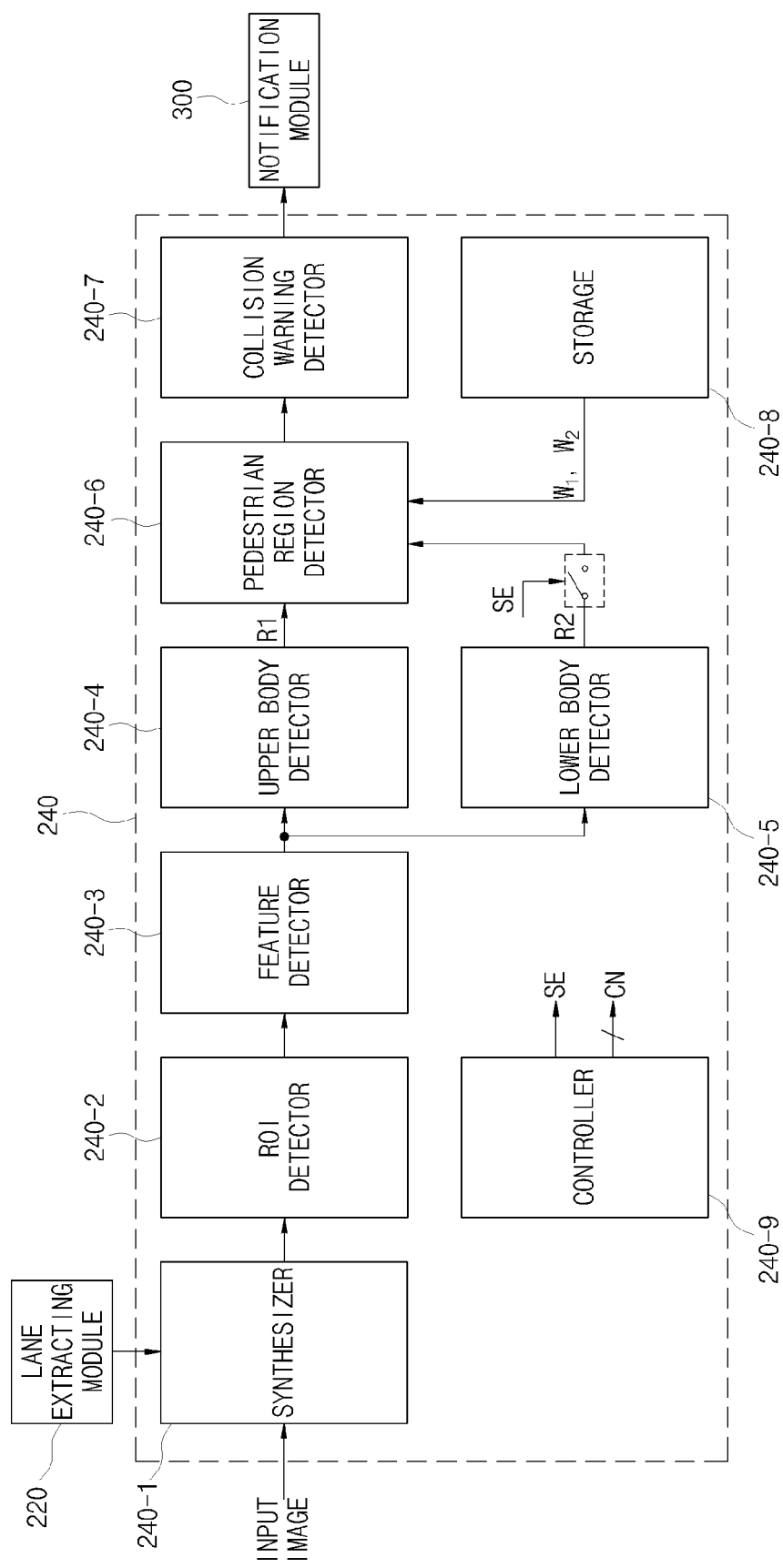
FIG. 3 is a block diagram illustrating an internal configuration of a pedestrian detecting module of FIG. 2.

FIG. 3 is a block diagram illustrating an internal configuration of the pedestrian detecting module of FIG. 2.

Referring to FIG. 3, the pedestrian detecting module 240 includes a synthesizer 240-1, an ROI detector 240-2, a feature detector 240-3, an upper body detector 240-4, a lower body detector 240-5, a pedestrian region detector 240-6, a collision warning determiner 240-7, a storage 240-8, and a controller 240-9.

The synthesizer 240-1 synthesizes an input image, which is output from the image sensor module 100, and a lane coordinate value which is output from the lane extracting module 220.

The ROI detector 240-2 detects a plurality of pedestrian ROIs by using the lane coordinate value, and sets a search window for searching for each of the pedestrian ROIs. Here, the search window may have different sizes for the pedestrian ROIs.

The feature extractor 240-3 searches for each of the pedestrian ROIs by using the search window, and extracts a pedestrian feature from a region which is searched by the search window. Hereinafter, the pedestrian feature is assumed as an HOG feature based on an HOG feature extracting algorithm, but is not limited thereto. All algorithms capable of recognizing a human may be used.

The upper body detector 240-4 receives the HOG feature extracted from the region which is searched by the search window, detects whether an upper body region of the pedestrian is included in the HOG feature extracted from the searched region, by using a pre-learned upper body HOG feature, and outputs a first result value R1 obtained by digitizing the detection result. For example, when a matching rate between the HOG feature extracted from the searched region and the pre-learned upper body HOG feature is 60% or more, the upper body detector 240-4 determines the searched region as including the upper body region of the pedestrian, and outputs the first result value R1 obtained by digitizing the matching rate.

The lower body detector 240-5 selectively receives the HOG feature extracted from the region which is searched by the search window, detects whether a lower body region of the pedestrian is included in the HOG feature extracted from the searched region, by using a pre-learned lower body HOG feature, and outputs a second result value R2 obtained by digitizing the detection result. For example, when a matching rate between the HOG feature extracted from the searched region and the pre-learned lower body HOG feature is 60% or more, the lower body detector 240-5 determines the searched region as including the lower body region of the pedestrian, and outputs the second result value R2 obtained by digitizing the matching rate.

The pedestrian region detector 240-6 detects the searched region as a pedestrian region, based on the first result value R1 from the upper body detector 240-4. For example, when the first result value R1 is equal to or greater than the first result value R1, the pedestrian region detector 240-6 detects the searched region as the pedestrian region including the pedestrian.

Optionally, the pedestrian region detector 240-6 may perform an arithmetic operation on the first result value R1 (input from the upper body detector 240-4) and the second result value R2 input from the upper body detector 240-5, and when the arithmetic operation result value is equal to or greater than the threshold value, the pedestrian region detector 240-6 may detect the searched region as the pedestrian region including the pedestrian. For example, the pedestrian region detector 240-6 may summate the first result value R1 and the second result value R2, and when the summation result value is equal to or greater than the threshold value, the pedestrian region detector 240-6 may detect the searched region as the pedestrian region including the pedestrian.

Optionally, the pedestrian region detector 240-6 may give a first weight value W1 to the first result value R1, give a second weight value W2 lower than the first weight W1 to the second result value R2, and perform an arithmetic operation on the first result value R1 with the first weight value W1 given thereto and the second result value R2 with the second weight value W1 given thereto to detect the pedestrian region. For example, the pedestrian region detector 240-6 may summate the first result value R1 multiplied by the first weight value W1 and the second result value R2 multiplied by the second weight value W2, and when the summation result value is equal to or greater than the threshold value, the pedestrian region detector 240-6 may detect the searched region as the pedestrian region.

The collision warning determiner 240-7 receives a detection result from the pedestrian region detector 240-6, receives a vehicle speed value from an electronic control unit (ECU, not shown) of the vehicle, and determines whether there is collision, by using the detection result and the vehicle speed value.

The storage 240-8 is an element that stores values which are used in various arithmetic operations performed by the pedestrian processing module 240. For example, the storage 240-8 may store the first and second weight values W1 and W2 which are used in an arithmetic operation performed by the pedestrian region detector 240-6.

The controller 240-9 controls and manages an overall operation of the pedestrian processing module 240. For example, the logic elements 240-1 to 240-8 of the pedestrian processing module 240 may be controlled according to a control CN of the controller 240-9, and in order to increase a performance of pedestrian detection, a detection result R2 of the lower body detector 240-5 may be optionally output to the pedestrian region detector 240-6 according to a selection SE of the controller 240-9.

Hereinafter, a main operation performed by the pedestrian detecting module according to an embodiment of the present invention will be described in detail. First, an operation performed by the ROI detector 240-2 will be described in detail with reference to FIG. 4.

Figure 4:
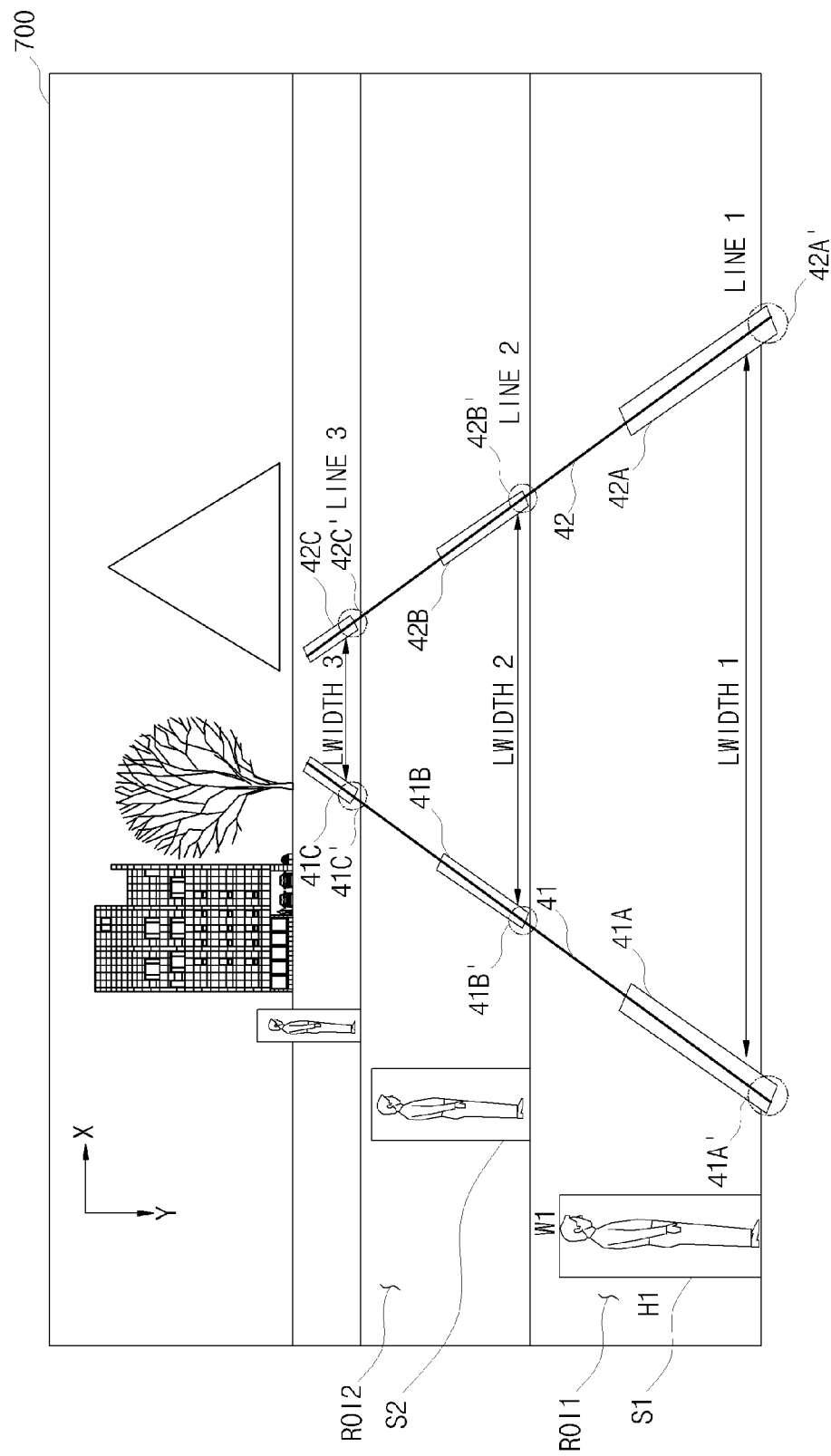
FIG. 4 is a diagram for describing an operation of detecting a region of interest (ROI) according to an embodiment of the present invention.

FIG. 4 is a diagram for describing an ROI detecting operation according to an embodiment of the present invention.

Referring to FIG. 4, in the ROI detecting operation according to an embodiment of the present invention, a lane coordinate value is used, and it is assumed that widths of pedestrian regions on X axis-direction lines LINE1 to LINE3 passing through ends of both lanes in an input image are the same. Under the assumption, a pedestrian ROI according to an embodiment of the present invention is set.

In detail, when a driver looks at a screen 70 from the front, a first line LINE1 passing through an end 41A' of a left lane 41A and an end 42A' of a right lane 42A may be defined in the left and right lanes 41A and 42A that are shown on a lowermost portion of the screen 70. A second line LINE2 passing through a lower end 41B' of a left lane 41B and a lower end 42B' of a right lane 42B may be defined in the left and right lanes 41B and 42B that are respectively disposed above the left and right lanes 41A and 42A. In this case, a region ROI1 between the first line LINE1 and the second line LINE2 is set as a pedestrian ROI that is proposed in the present invention. Similarly, when a third line LINE3 passing through a lower end 41C' of a left lane 41C and a lower end 42C' of a right lane 42C may be defined in the left and right lanes 41C and 42C that are respectively disposed above the left and right lanes 41B and 42B, a region ROI2 between the second line LINE2 and the third line LINE3 is set as a pedestrian ROI that is proposed in the present invention. Therefore, a pedestrian ROI set according to an embodiment of the present invention may be provided as two or more in one the screen 70, and the two or more pedestrian ROIs have different areas. When a plurality of pedestrian ROIs are set in one screen, an operation of setting a search window is performed.

Hereinafter, a search window setting operation will be described in detail.

As illustrated in FIG. 4, lane coordinate values may be marked as two nonparallel lanes in an input image. Therefore, when the driver looks at the screen 70 from the front, a lane interval between the two left and right lanes 41 and 42 becomes narrower in a direction from a lower portion to an upper portion.

In the first line LINE1, when a section between the ends 41A' and 42A' of the left and right lanes 41A and 42A is defined as a lane interval Lwidth1 between the left and right lanes 41A and 42A, a lane interval between the left and right lanes 41B and 42B is Lwidth2, and a lane interval between the left and right lanes 41C and 42C is Lwidth3. In the one screen 70, a lane interval becomes narrower in an upper direction, and a reduction rate is constant. Under such conditions, a width and height of a search window may be set. That is, if a ratio of a width of the lane interval Lwidth1 and a width of a pedestrian is known, a search window having an appropriate size for searching the pedestrian ROI ROI1 set in a lower portion of the screen 70 may be set. Similarly, a search window having an appropriate size for searching a pedestrian ROI ROI2 set in an upper portion of the screen 70 may be set. A size of a search window may be calculated through the following Equation (1):

$$\begin{pmatrix} W(Y) \\ H(Y) \end{pmatrix} = \begin{pmatrix} 1 & \frac{1}{\alpha} \\ 1 & \frac{2.5}{\alpha} \end{pmatrix} \begin{pmatrix} \gamma \\ L\text{width}(Y) \end{pmatrix} \quad (1)$$

where α and γ denote ratio variables for calculating a width of an actual human from a lane interval, W(Y) denotes a width of the search window, H(Y) denotes a height of the search window, and Lwidth(Y) is a lane interval.

A ratio of a width and height of a pedestrian is statistically calculated as 2 to 2.5. Therefore, when calculating the height H(Y), a value of 2 to 2.5 may be used. Equation (1) is an equation for calculating the size of the search window when the ratio of the width and height of the pedestrian is 2.5.

It can be seen in Equation (1) that a search-window size is proportional to a lane interval. Therefore, in FIG. 4, a window size S1 calculated for searching for a pedestrian ROI that is set with respect to the first line LINE1 is set greater than a window size S2 calculated for searching for a pedestrian ROI that is set with respect to the second line LINE2.

As described above, a window size (i.e., a size of a pedestrian region) which is set based on a lane interval is predicted, and thus, a pedestrian can be quickly detected. For example, unlike the present invention, when a pedestrian ROI is not set, and it is unable to predict a window size corresponding to a pedestrian size in each pedestrian ROI, a whole region of an input image should be searched by incrementally increasing the window size, and for this reason, the number of operations for pedestrian detection increases exponentially.

Hereinafter, an operation of detecting an upper body HOG feature and a lower body HOG feature from an HOG feature detected by the feature detector 240-3 of FIG. 3 will be described in detail with reference to FIGS. 5 and 6.

Figure 5:
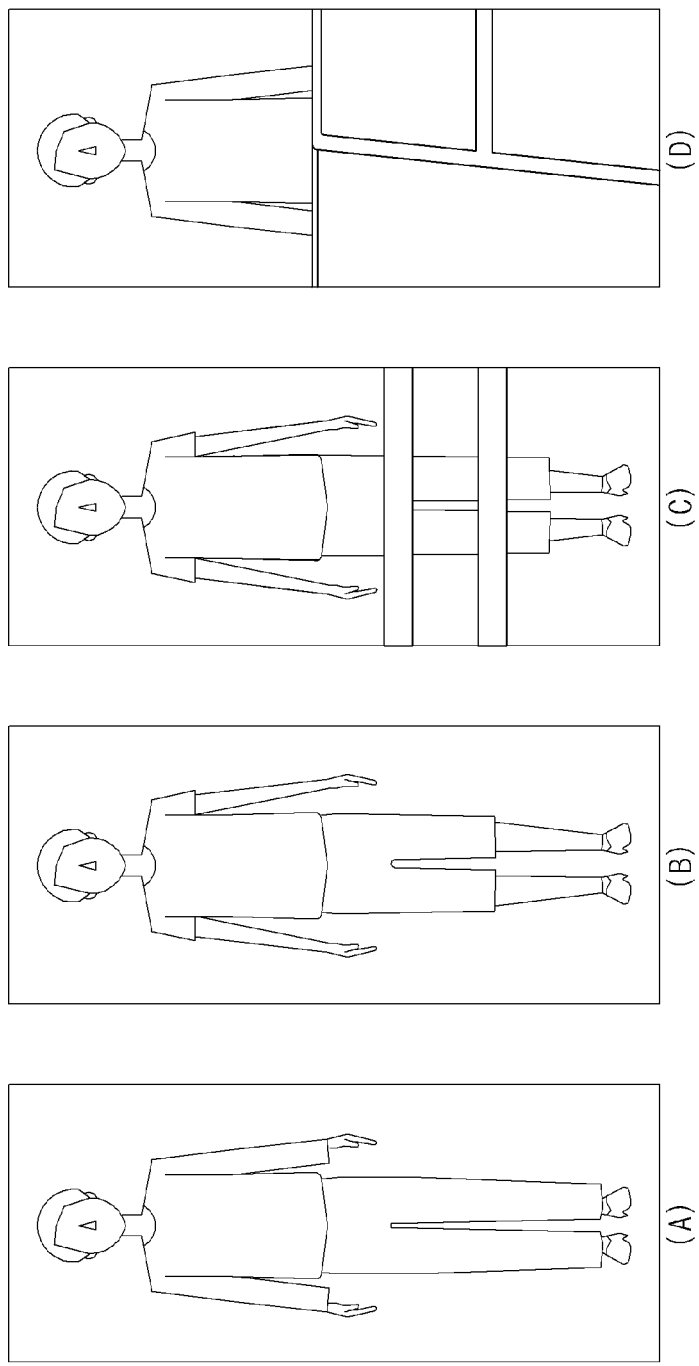
FIGS. 5 and 6 are diagrams for describing an operation of detecting an upper body Histogram of Oriented Gradient (HOG) feature and a lower body HOG feature from an HOG feature according to an embodiment of the present invention.
Figure 6:
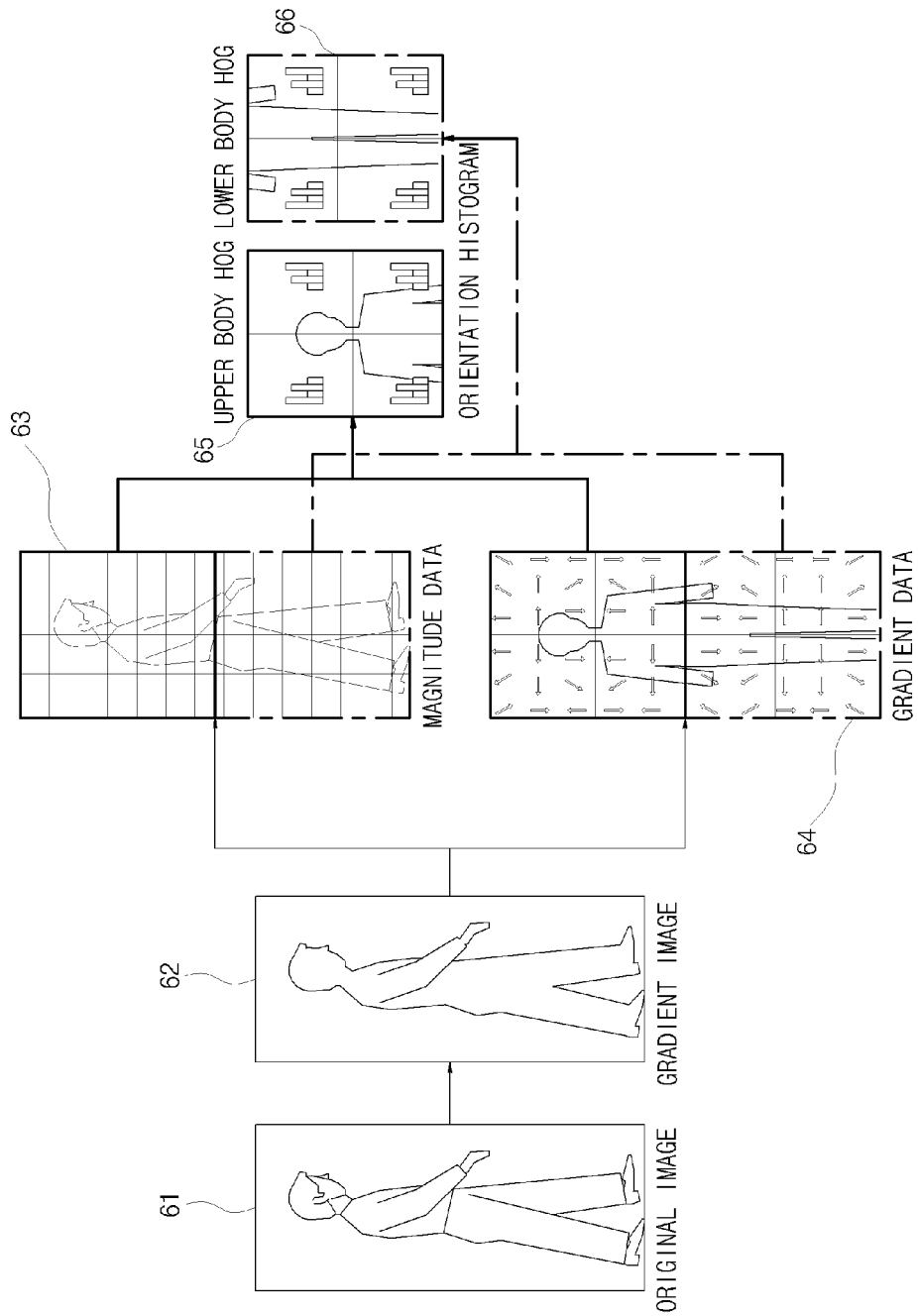

FIGS. 5 and 6 are diagrams for describing an operation of detecting an upper body HOG feature and a lower body HOG feature from an HOG feature according to an embodiment of the present invention.

Referring to FIGS. 5 and 6, when a pedestrian ROI and a search window for searching for the pedestrian ROI are set as described above with reference to FIG. 4, an HOG feature is extracted from a region which is searched by the search window in the pedestrian ROI.

FIG. 5 shows four pedestrian images having different patterns. A pattern (A) is a general pedestrian image. However, in a pattern (B), a lower body pattern may be changed depending on a worn item of a pedestrian as in shorts, skirts, and shoes. Comparing a lower body pattern of a pedestrian (which is running or walking) and a lower body pattern of when the pedestrian is standing, a motion change range of a lower body is relatively greater than that of an upper body. As in patterns (C) and (D), a case in which a lower body of a pedestrian is covered by an obstacle occurs more frequently than a case in which an upper body is covered by an obstacle. That is, a change factor of a lower body is greater than that of an upper body. Therefore, the present invention provides a method that divides a pedestrian region into an upper region and a lower region to detect a pedestrian.

In detail, referring to FIG. 6, a gradient is calculated from an input image (an original image) 61 by using the following Equation (2):

$$G_x(x, y) = [-1 \ 0 \ 1] \times I(x, y), \quad (2)$$
$$G_y(x, y) = [-1 \ 0 \ 1]^T \times I(x, y)$$
$$G(x, y) = \sqrt{G_x(x, y)^2 + G_y(x, y)^2},$$
$$\theta(x, y) = \arctan\left(\frac{G_y(x, y)}{G_x(x, y)}\right)$$

A gradient image 62 having edge information on each image pixel may be extracted from a gradient calculated through Equation (2).

Magnitude data G(x, y) may be accumulated based on gradient data 64 of each pixel in the gradient image 62, and then, an upper body HOG feature 65 and a lower body HOG feature 66 may be calculated by dividing the accumulated magnitude data G(x, y) by a total pixel value.

An upper body detecting operation bisects a region which is searched by a search window in a pedestrian ROI, and compares the HOG feature 65 detected from a searched upper region and a pre-learned upper body HOG feature to detect an upper body. For example, it can be seen that a pedestrian is not located in the searched region, without detecting the upper body or comparing an HOG feature detected from a lower region and a pre-learned lower body HOG feature, and thus, when the upper body is not detected, an operation of detecting a lower body from the lower region may not be performed. Therefore, the number of operations for detection can be reduced by half.

When the upper body is detected, there is a high possibility that the lower body of the pedestrian is located in the lower region of the searched region, and thus, a lower body detecting operation extracts a lower body HOG feature from a corresponding region, and compares the lower body HOG feature with the pre-learned lower body HOG feature to detect the lower body. When the lower body is detected in this way, a pedestrian region is finally detected.

As described above, a pedestrian detecting operation performs an arithmetic operation on a first result value obtained by digitizing the upper body detection result and a second result value obtained by digitizing the lower body detection result, and when the arithmetic operation result value is equal to or greater than a threshold value, the pedestrian detecting operation finally determines the searched region as the pedestrian region. In this case, errors of pedestrian detection can be minimized by giving a weight value to the upper body result and the lower body result. For example, by giving a high weight value to the upper body detection result, the pedestrian region can be stably detected even when the lower body includes noise (an obstacle). This may be expressed as Equation (3):

$$\text{pedestrian region detection result} = (W_1 \times R_1) + (W_2 \times R_2),$$
$$W_2 = 1 - W_1 \quad (3)$$

When the pedestrian region detection result obtained through Equation (3) is output, a lane interval and a width of a search window are measured, and a TTC is calculated based on a vehicle speed value. When the TTC is equal to or greater than a threshold value, a collision warning is issued to a driver.

Figure 7:
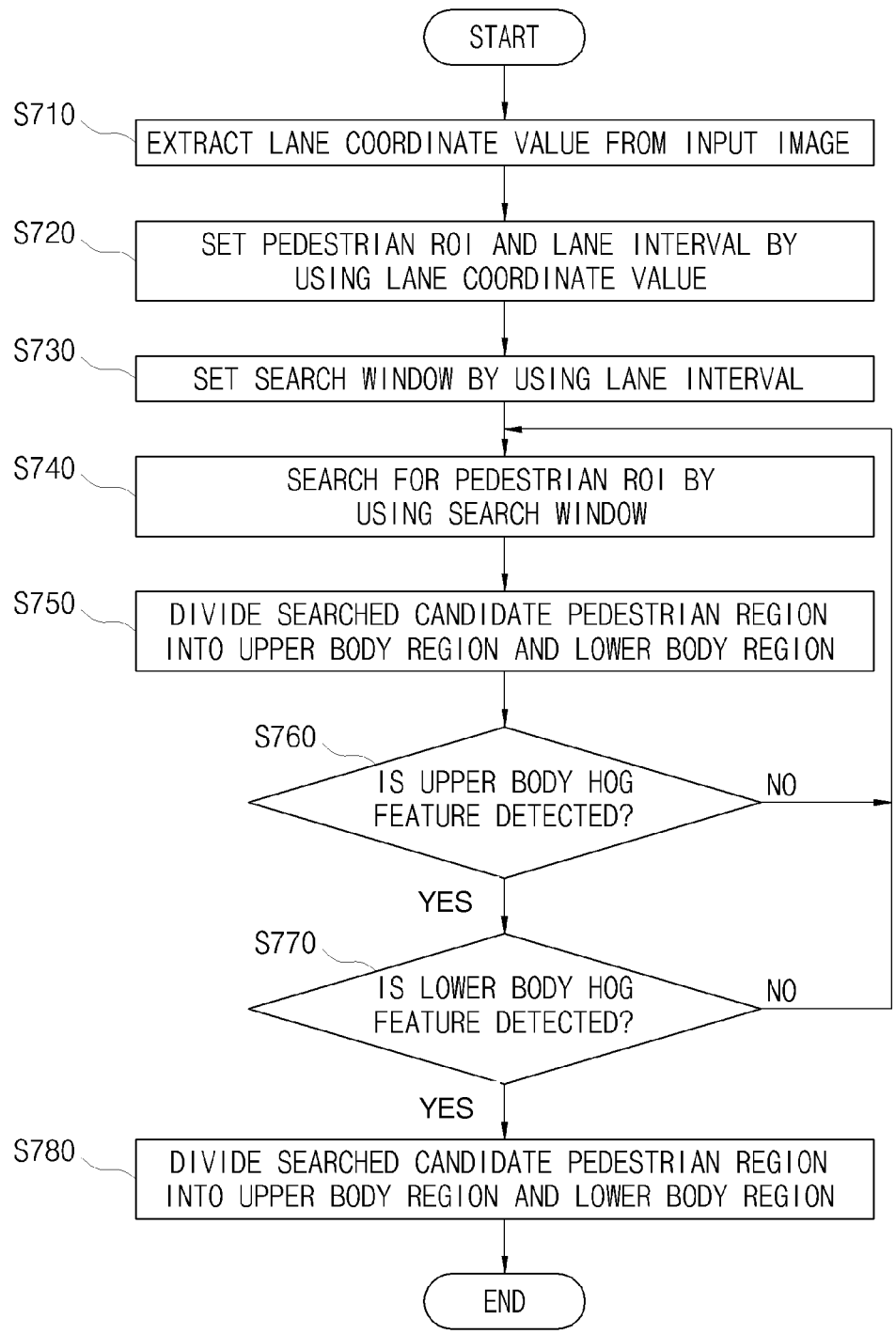
FIG. 7 is a flowchart illustrating a pedestrian detecting method according to an embodiment of the present invention.

FIG. 7 is a flowchart illustrating a pedestrian detecting method according to an embodiment of the present invention.

Referring to FIG. 7, in step S710, the pedestrian detecting apparatus first performs an operation that extracts a lane coordinate value constituting a lane in an input image. For example, the lane coordinate value may be extracted from the input image through a lane detection algorithm.

Subsequently, in step S720, the pedestrian detecting apparatus performs an operation that sets a pedestrian ROI and a lane interval by using the extracted lane coordinate value. For example, as described above with reference to FIG. 4, when a driver looks at a screen from the front, a region between a first line (passing through a lower end of a first left lane and a lower end of a right lane which is formed in parallel with the first left lane) and a second line (passing through lower ends of second left and right lanes which are respectively formed above the first left and right lanes) is set as the pedestrian ROI. The lane interval may be set as a distance between the lower end of the first left lane and the lower end of the first right lane.

Subsequently, in step S730, the pedestrian detecting apparatus performs an operation that sets a search window by using the set lane interval. For example, the search window may be set through Equation (1).

Subsequently, in step S740, the pedestrian detecting apparatus performs an operation that searches the pedestrian ROI by using the set search window.

Subsequently, in step S750, the pedestrian detecting apparatus performs an operation that divides a searched candidate pedestrian region into an upper body region and a lower body region. For example, the searched candidate pedestrian region may be bisected in a width direction to have a size of the search window, an upper region may be set as an upper body region, and a lower region may be set as a lower body region.

Subsequently, in step S760, the pedestrian detecting apparatus performs an operation that detects an upper body HOG feature from the upper body region. When the upper body HOG feature is detected from the upper body region, the pedestrian detecting apparatus proceeds to step S770. When the upper body HOG feature is not detected from the upper body region, the pedestrian detecting apparatus again performs steps S740 and S750.

When the upper body HOG feature is detected from the upper body region, in step S770, the pedestrian detecting apparatus performs an operation that detects a lower body HOG feature from the lower body region. When the lower body HOG feature is detected from the lower body region, the pedestrian detecting apparatus proceeds to step S780. When the lower body HOG feature is not detected from the lower body region, the pedestrian detecting apparatus again performs steps S740, S750 and S760.

When the lower body HOG feature is detected from the lower body region, in step S780, the pedestrian detecting apparatus performs an operation that detects the candidate pedestrian region as a pedestrian region.

In addition, step S770 may be optionally performed. For example, when desiring to reduce a detection time and the number of operations, the candidate pedestrian region may be detected as the pedestrian region by performing only step S760 without performing step S770. In order to increase an accuracy of detection, all of the upper body HOG feature and lower body HOG feature may be detected by performing steps S760 and S770, and the candidate pedestrian region may be detected as the pedestrian region.

In FIG. 7, when all steps S760 and S770 are performed, it is described that step S770 is performed after step S760, but is not limited thereto. As another example, step S760 may be performed after step S770. In this case, in consideration that a detection probability of a lower body HOG feature is relatively lower than that of an upper body HOG feature, an operation of detecting the lower body HOG feature and an operation of detecting the upper body HOG feature may be all performed.

As described above, the present invention sets a pedestrian ROI and a size of a search window by using lane information, divides a region (which is searched in the size of the search window in the pedestrian ROI) into an upper body region and a lower body region, and detects a pedestrian feature from each of the divided regions, thereby efficiently restricting a region which is to be searched by the search window in a whole region of an image. Accordingly, a processing time is shortened. Also, the present invention determines a pedestrian feature in each of the upper body region and the lower body region, thereby enhancing a pedestrian detection rate.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing apparatus for detecting pedestrians, the image processing apparatus comprising:
a lane detecting module configured to extract a lane coordinate value from an input image; and
a pedestrian detecting module configured to set, as a pedestrian region of interest (ROI), a region between a first line passing through ends of first left and right lanes and a second line passing through ends of second left and right lanes which are respectively disposed above the left and right lanes, and search for the pedestrian ROI by using a predetermined window to detect a pedestrian region having a pedestrian feature,
wherein the pedestrian detecting module divides the pedestrian region into an upper body region and a lower body region, and when the pedestrian feature is detected from at least one of the upper body region and the lower body region, the pedestrian detecting module detects the pedestrian region as a final pedestrian region.

2. The image processing apparatus of claim 1, wherein the pedestrian detecting module calculates a lane interval which is defined as a length of a line connecting ends of the first left and right lanes, and sets the window by using the calculated lane interval.

3. The image processing apparatus of claim 2, wherein a size of the window is proportional to the lane interval.

4. The image processing apparatus of claim 2, wherein the window includes a width, which is calculated by using the lane interval and a ratio variable used to calculate a width of a pedestrian from the lane interval, and a height which is calculated by using the width and a ratio variable between the width and a height of the pedestrian.

5. The image processing apparatus of claim 1, wherein when the pedestrian feature corresponding to an upper body of the pedestrian is detected from the upper body region, and a pedestrian feature corresponding to a lower body of the pedestrian is detected from the lower body region, the pedestrian detecting module detects the pedestrian region as a final pedestrian region.

6. The image processing apparatus of claim 5, wherein the pedestrian detecting module summates a first result value, which is obtained by digitizing the upper body feature detected by using an upper body window, and a second result value which is obtained by digitizing the lower body feature detected by using a lower body window, and when the summation result value is equal to or greater than a threshold value, the pedestrian detecting module detects the pedestrian region as a final pedestrian region.

7. The image processing apparatus of claim 6, wherein the pedestrian detecting module summates the first result value with a first weight value given thereto and the second result value with a second weight value given thereto.

8. The image processing apparatus of claim 1, wherein the pedestrian feature is a histogram of gradient (HOG) feature.

9. A pedestrian detecting method in an image processing apparatus, the pedestrian detecting method comprising:
 extracting a lane coordinate value from an input image;
 setting a pedestrian region of interest (ROI) and a lane interval in the input image by using the extracted lane coordinate value;
 setting a search window by using the set lane interval; and
 detecting a pedestrian region in the set pedestrian ROI by using a pedestrian detection algorithm,
 wherein the setting of a search window comprises:
 setting a width of the search window by using the lane interval and a ratio variable used to calculate a width of a pedestrian from the lane interval; and
 setting a height of the search window by using the set width and a ratio variable between the width and a height of the pedestrian.

10. The pedestrian detecting method of claim 9, wherein the detecting of a pedestrian region comprises:
 dividing the pedestrian ROI into an upper body region and a lower body region; and
 when the pedestrian feature is detected from at least one of the upper body region and the lower body region by using the pedestrian detection algorithm, detecting a corresponding pedestrian candidate region, from which the pedestrian feature is detected, as the pedestrian region.

11. The pedestrian detecting method of claim 9, wherein, the pedestrian feature comprises an upper body feature and lower body feature of a pedestrian, and
the detecting of a pedestrian region comprises:
 dividing the pedestrian ROI into an upper body region and a lower body region;
 extracting a histogram of gradient (HOG) feature corresponding to the upper body feature from the upper body region;
 extracting an HOG feature corresponding to the lower body feature from the lower body region; and
 when the HOG features are respectively extracted from the upper body region and the lower body region, detecting a pedestrian candidate region, including the upper body region and the lower body region, as the pedestrian region.

12. The pedestrian detecting method of claim 11, wherein the detecting of a pedestrian region comprises:
 summating a first result value, which is obtained by digitizing a detection result of the upper body feature detected from the upper body region, and a second result value which is obtained by digitizing a detection result of the lower body feature detected from the lower body region;
 comparing the summation result value and a threshold value; and
 when the summation result value is equal to or greater than the threshold value, detecting the pedestrian candidate region as the pedestrian region.

13. The pedestrian detecting method of claim 12, wherein the summating comprises:
 giving a first weight value to the first result value;
 giving a second weight value, which is lower than the first weight value, to the second result value; and
 summating the first result value with the first weight value given thereto and the second result value with the second weight value given thereto.

* * * * *